United States Patent [19]
Hashimoto et al.

[11] Patent Number: 5,855,628
[45] Date of Patent: Jan. 5, 1999

[54] GAS OIL COMPOSITIONS AND GAS OIL ADDITIVES

[75] Inventors: Jiro Hashimoto; Junzo Ito; Masahiro Fukuda, all of Wakayama, Japan

[73] Assignee: Kao Corporation, Tokyo, Japan

[21] Appl. No.: 637,382

[22] Filed: Apr. 24, 1996

[30] Foreign Application Priority Data

Apr. 24, 1995 [JP] Japan ..................... 7-098539
Nov. 8, 1995 [JP] Japan ..................... 7-290096

[51] Int. Cl.$^6$ ....................................... C10L 1/18
[52] U.S. Cl. ................................ 44/308; 44/389
[58] Field of Search ................... 508/486, 491; 44/308, 389

[56] References Cited

U.S. PATENT DOCUMENTS

| | | | |
|---|---|---|---|
| 2,496,328 | 2/1950 | Bell et al. | |
| 4,137,334 | 1/1979 | Heine et al. | 426/310 |
| 4,822,507 | 4/1989 | Kanamori et al. | 508/438 |
| 4,950,415 | 8/1990 | Malito | 508/439 |
| 5,114,603 | 5/1992 | Kennedy et al. | |
| 5,538,654 | 7/1996 | Lawate et al. | 508/437 |

FOREIGN PATENT DOCUMENTS

| | | |
|---|---|---|
| 0227218 | 7/1987 | European Pat. Off. |
| 0-608149 | 1/1994 | European Pat. Off. |
| 1331343 | 2/1970 | United Kingdom |
| 94 17160 | 8/1994 | WIPO |
| 9417160 | 8/1994 | WIPO |

*Primary Examiner*—Margaret Medley
*Attorney, Agent, or Firm*—Birch, Stewart, Kolasch & Birch, LLP

[57] ABSTRACT

A gas oil composition having improved lubricity which can reduce wear of metallic surfaces which the composition contacts comprises a gas oil having a low sulfur content, and a glycerol/monofatty acid ester and a glycerol/difatty acid ester which have a specific fatty acid residue composition

8 Claims, No Drawings

GAS OIL COMPOSITIONS AND GAS OIL ADDITIVES

BACKGROUND OF THE INVENTION

1. Field of the Invention

The present invention relates to a gas oil, such as a diesel fuel, composition having improved lubricity and a low sulfur content which can reduce wear of metallic surfaces the composition contacts; a gas oil additive to be used for the gas oil composition; and a process for preparing the gas oil additive.

2. Description of the Related Art

In recent years, environmental pollution by nitrogen oxides ($NO_X$), sulfur oxides ($SO_X$) and particulate matters each contained in an exhaust gas coming from diesel cars has arisen as a problem. To describe specially, it has been a problem that acid matter formed by the combustion of sulfur components contained in gas oil as a fuel for engines causes corrosion and wear of metal, and acid rain. Up to now, nitrogen oxides and sulfur oxides contained in exhaust gas have been regulated, and a new regulation with respect to particulate matter has been added.

It has been firstly proposed as a countermeasure for this regulation with respect to the particulate matter to reduce the sulfur oxides contained in exhaust gas, in other word, to cut down a sulfur content of gas oil in stages. Further, the amendment (1990) of the Clean Air Act in U.S.A. provides that the sulfur content of gas oil as a quality standard must be 0.05% by weight or less. In Japan, it is anticipated that there will be taken a phased countermeasure to restrict the sulfur content among the quality standard of gas oil in Japan firstly to 0.2% by weight or less, and further to 0.05% by weight or less within this century. Under such circumstances, patent applications each disclosing a process for preparing a gas oil for diesel engines having a low sulfur content have been filed, and, further, gas oils each having a low sulfur content have already been put on the market in, e.g., Europe and U.S.A.

However, reductions in the sulfur content of the gas oil has caused a new problem of fuel pump seizures due to a reduction of the lubricity of the gas oil (see SAE Paper 942016). By using a gas oil having a low sulfur content and a low aromatic-compounds content as an environment-protecting fuel, in fact, several thousands of cars have encountered troubles caused by a lack in the lubricity of the gas oil in Sweden in Europe. While, in Japan, gas oils for diesel engines each having a low sulfur content are not presently popular. However, also in Japan, it is anticipated that the employment of gas oils for diesel engines having a low sulfur content in the near future will cause the problems of seize of a fuel pump and wear of metallic surfaces. International Publication No. WO 94/17160 (published on Aug. 4, 1994) and European Patent Publication-A No. 0608149 (published on Jul. 27, 1994) disclose fuel compositions each comprising an ester of a carboxylic acid having 2 to 50 carbon atoms with an alcohol, which are useful to improve lubricity and reduce wear in diesel engines. In thses documents, glycerol monooleate and diisodecyl adipate are cited as examples of such esters. However, the fuel compositions are expensive, and the objects of the inventions described in the above documents, i.e., improvement of lubricity and reduction of wear in diesel engines, are not sufficiently attained by the fuel compositions.

DISCLOSURE OF THE INVENTION

Summary of the Invention

An object of the present invention is to provide a low-sulfur gas oil composition having improved lubricity which can reduce wear of metallic surfaces, such as two surfaces of a fuel pump facing each other and sliding on each other, the composition contacts.

The other object of the present invention is to provide a gas oil additive which can give lubricity to a gas oil having a low sulfur content, and a process for preparing the gas oil additive.

The present inventors have made extensive studies to attain the objects described above. As a result of the studies, they have found that the objects described above are attained by using a mixture of glycerol/fatty acid esters having a specific fatty acid residue composition. The present invention has been completed on the basis of this finding.

Thus, the first embodiment of the present invention relates to a gas oil composition comprising a low-sulfur gas oil, a first compound represented by the following formula (I), a second compound represented by the following formula (II) and a third compound represented by the following formula (III), wherein the total amount of the compounds represented by formulas (I) and (II) is not less than 80% by weight and less than 100% by weight based on the total weight of the compounds represented by formulas (I), (II) and (III); and the weight ratio of the compound represented by formula (I) to the compound represented by formula (II) is 0.25 to 4.0:

  (I)

wherein $X_1$, $X_2$ and $X_3$ each represents a hydrogen atom or a group represented by the formula: RCO-, wherein R represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms, two of $X_1$, $X_2$ and $X_3$ are hydrogen atoms, and one of $X_1$, $X_2$ and $X_3$ is a group represented by the formula: RCO-, wherein R is as defined above;

  (II)

wherein $X_4$, $X_5$ and $X_6$ each represents a hydrogen atom or a group represented by the formula: RCO-, wherein R is as defined above, one of $X_1$, $X_2$ and $X_3$ is a hydrogen atom, and two of $X_1$, $X_2$ and $X_3$ are each a group represented by the formula: RCO-, wherein R is as defined above; and

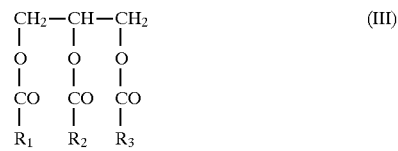  (III)

wherein $R_1$, $R_2$ and $R_3$ each represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms.

Further, the second embodiment of the present invention relates to a gas oil composition comprising a low-sulfur gas oil, a first compound represented by the above formula (I), a second compound represented by the above formula (II), a third compound represented by the above formula (III) and a fourth compound represented by the following formula (IV), wherein the total amount of the compounds represented by formulas (I) and (II) is not less than 80% by weight and less than 100% by weight based on the total weight of the compounds represented by formulas (I), (II), (III) and (IV); and the weight ratio of the compound represented by formula (I) to the compound represented by formula (II) is 0.25 to 4.0:

In the above formulas (I) and (II), R is preferably a linear alkyl group having 9 to 22 carbon atoms, a branched alkyl group having 10 to 22 carbon, an alkyl group having a cycloalkyl moiety and having 10 to 22 carbon atoms in total, a linear alkenyl group having 9 to 22 carbon atoms or a branched alkenyl group having 10 to 22 carbon atoms, and particularly preferably a linear or branched alkyl group having 10 to 22 carbon atoms, an alkyl group having a cycloalkyl moiety and having 10 to 22 carbon atoms in total, or a linear or branched alkenyl group having 10 to 22 carbon atoms.

In the above formula (III), $R_1$, $R_2$ and $R_3$ are each preferably a linear alkyl group having 9 to 22 carbon atoms, a branched alkyl group having 10 to 22 carbon, an alkyl group having a cycloalkyl moiety and having 10 to 22 carbon atoms in total, a linear alkenyl group having 9 to 22 carbon atoms or a branched alkenyl group having 10 to 22 carbon atoms, and particularly preferably a linear or branched alkyl group having 10 to 22 carbon atoms, an alkyl group having a cycloalkyl moiety and having 10 to 22 carbon atoms in total, or a linear or branched alkenyl group having 10 to 22 carbon atoms.

In the above gas oil composition, the total amount of the compounds represented by formulas (I) and (II) is preferably 0.001 to 0.1 part by weight, still more preferably 0.001 to 0.01 part by weight, based on 100 parts by weight of the gas oil.

It is preferable to use a gas oil having a sulfur content of 0.2% by weight or less, and particularly preferable to use one having a sulfur content of 0.05% by weight or less.

The third embodiment of the present invention relates to a method for reducing wear of metallic surfaces such as two surfaces of a fuel pump facing each other and sliding on each other, which comprises using the above-mentioned gas oil composition, and use of the above-mentioned gas oil composition for reducing wear of metallic surfaces such as two surfaces of a fuel pump facing each other and sliding on each other.

The forth embodiment of the present invention relates to a mixture comprising a first compound represented by the above formula (I), a second compound represented by the above formula (II) and a third compound represented by the above formula (III) as an additive, wherein the total amount of the compounds represented by formulas (I) and (II) is not less than 80% by weight and less than 100% by weight based on the total weight of the compounds represented by formulas (I), (II) and (III); and the weight ratio of the compound represented by formula (I) to the compound represented by formula (II) is 0.5 to 4.0, preferably 1.0 to 2.5.

The fifth embodiment of the present invention relates to a mixture comprising a first compound represented by the above formula (I), a second compound represented by the above formula (II), a third compound represented by the above formula (III) and a fourth compound represented by the above formula (IV) as an additive, wherein the total amount of the compounds represented by formulas (I) and (II) is not less than 80% by weight and less than 100% by weight based on the total weight of the compounds represented by formulas (I), (II), (III) and (IV); and the weight ratio of the compound represented by formula (I) to the compound represented by formula (II) is 0.5 to 4.0, preferably 1.0 to 2.5.

The above-mentioned mixtures as additives each preferably has such a fatty acid residue composition that an unsaturated fatty acid(s) having one double bond is 75 to 85% by weight, an unsaturated fatty acid(s) having two double bonds is 5 to 10% by weight and a saturated fatty acid(s) is 5 to 20% by weight, based on the total weight of the fatty acids originating from acyl groups in the compounds represented by formulas (I), (II) and (III), and still more preferably has such a fatty acid residue composition that 9-octadecenoic acid is 68 to 78% by weight, based on the total weight of the fatty acids originating from acyl groups in the compounds represented by formulas (I), (II) and (III).

The above-mentioned mixtures as additives are used for reducing wear of metallic surfaces.

The above-mentioned mixture comprising a fourth compound represented by the formula (IV) as an additive preferably contains the compound represented by the formula (IV) in such an amount that it is more than 0% by weight and 2.5% by weight or less, based on the total weight of the compounds represented by formulas (I), (II), (III) and (IV).

Furthermore, the present invention relates to a process for preparing a mixture of a glycerol/fatty acid monoester, a glycerol/fatty acid diester and a glycerol/fatty acid triester, which comprises a step of esterifying 1 mole of glycerol with 0.7 to 2 mole of at least one member selected from the group consisting of a saturated linear fatty acid having 10 to 23 carbon atoms, a saturated branched fatty acid having 10 to 23 carbon atoms, a saturated fatty acid having a cycloalkyl moiety and having 10 to 23 carbon atoms in total, an unsaturated (double bond) linear fatty acid having 10 to 23 carbon atoms and an unsaturated (double bond) branched fatty acid having 10 to 23 carbon atoms.

In addition, the present invention relates to a process for preparing a mixture of a glycerol/fatty acid monoester, a glycerol/fatty acid diester, a glycerol/fatty acid triester and glycerol, which comprises a step of esterifying 1 mole of glycerol with 0.7 to 2 mole of at least one member selected from the group consisting of a saturated linear fatty acid having 10 to 23 carbon atoms, a saturated branched fatty acid having 10 to 23 carbon atoms, a saturated fatty acid having a cycloalkyl moiety and having 10 to 23 carbon atoms in total, an unsaturated (double bond) linear fatty acid having 10 to 23 carbon atoms and an unsaturated (double bond) branched fatty acid having 10 to 23 carbon atoms.

The fatty acid as the raw material is preferably a fatty acid mixture comprising, based on the total weight of the mixture, 75 to 85% by weight of an unsaturated fatty acid having one double bond, 5 to 10% by weight of an unsaturated fatty acid having two double bonds and 5 to 20% by weight of a saturated fatty acid, and still more preferably a fatty acid mixture comprising, based on the total weight of the mixture, 68 to 78% by weight of 9-octadecenoic acid.

The present invention will now be illustrated in detail.

DETAILED DESCRIPTION OF THE INVENTION

Although the gas oil in the present invention refers to the one which is usually sold as "gas oil", that having a sulfur content of 0.2% by weight or less is preferable and that having a sulfur content of 0.05% by weight or less is particularly preferable. The gas oil having a low sulfur content is prepared by a method wherein, with a hydrodesulfurizing apparatus, a gas oil cut prepared by distillating crude oil under atmospheric pressures is, for example, (1) hydrodesulfurized at a high reaction temperature, (2) hydrodesulfurized under a high hydrogen partial pressure, or (3) hydrodesulfurized with a hydrodesulfurization catalyst having a high activity. The gas oil having a sulfur content of 0.2% by weight or less described above refers to the one of which the sulfur content measured by a radiation type excitation method described in JIS K 2541 is 0.2% by weight or less, and the desulfurizing method is not specifically restricted.

Gas oil additives in the present invention are mixtures of a glycerol/fatty acid monoester (hereinafter abbreviated as a monoglyceride) represented by formula (I), a glycerol/fatty acid diester (hereinafter abbreviated as a diglyceride) represented by formula (II) and a glycerol/fatty acid triester (hereinafter abbreviated as a triglyceride) represented by formula (III), optionally together with glycerol represented by formula (IV).

Specific examples of a linear or branched alkyl group having 9 to 22 carbon atoms, an alkyl group having a cycloalkyl moiety and having 9 to 22 carbon atoms in total, and a linear or branched alkenyl group having 9 to 22 carbon atoms in the definitions of R, in the definitions of $X_1$, $X_2$ and $X_3$ in formula (I), R, in the definitions of $X_4$, $X_5$ and $X_6$ in formula (II), and $R_1$, $R_2$ and $R_3$ in formula (III) include those which will be described below.

Examples of the linear alkyl groups include nonyl group, decyl group, undecyl group, dodecyl group, tridecyl group, tetradecyl group, pentadecyl group, hexadecyl group, octadecy group, nonyldecyl group, eicosanyl group, heneicossanyl group and docosyl group.

Examples of the branched alkyl groups include 1-methylnonyl group, 1-propylheptyl group, 3,7-dimethyloctyl group, 2,4,6-trimethylheptyl group, 1-methyldecyl group, 2-methyldecyl group, 2-ethylnonyl group, 1-methylundecyl group, 2-methylundecyl group, 2-ethyldecyl group, 1-(2'-methylpropyl)-3,5-dimethylhexyl group, 2,4,6,8-tetramethylnonyl group, 2-methyldodecyl group, 2-ethylundecyl group, 1-(3'-methylbutyl)-6-methylheptyl group, 1-(1'-methylbutyl)-4-methylheptyl group, 1-methyltridecyl group, 2-methyltridecyl group, 2-ethyldodecyl group, 2-(3'-methylbuyl)-7-methyloctyl group, 2-(1'-methylbutyl)-5-methyloctyl group, 1-hexylnonyl group, 2-methyltetradecyl group, 2-ethyltridecyl group, 1-methylpentadecyl group, 1-(1',3',3'-trimethylbutyl)-4,6,6-trimethylheptyl group, 1-(3'methylhexyl)-6-methylnonyl group, 8-methylheptadecyl group, 2-heptylundecyl group, 2-(1',3', 3'-trimethylbutyl)-5,7,7-trimethyloctyl group, 2-(3'-methylhexyl)7-methyldecyl group, 2-methyloctadecyl group, 2,3-dimethylheptadecyl group, 3-methylnonadecyl group, 2,2-dimethyloctadecyl group, 2,3-dimethyloctadecyl group, 2-butyl-2-heptylnonyl group, 2-methyleicosanyl group and 20-methylheneicosanyl group.

Examples of the alkyl groups each having a cycloalkyl moiety include 4-cyclohexylbutyl group, butylcyclohexyl group and 3,3,5,5-tetramethylcyclohexyl group.

Examples of the linear alkenyl groups include 2-decenyl group, 9-decenyl group, 9-undecenyl group, 10-undecenyl group, 2-dodecenyl group, 3-dodecenyl group, 2-tridecenyl group, 4-tetradecenyl group, 9-tetradecenyl group, 9-pentadecenyl group, 9-hexadecenyl group, 9-heptadecenyl group, 9-octadecenyl group, 9,12-octadecadienyl group, 9,12,15-octadecatrienyl group, 9-nonadecenyl group, 11-eicosenyl group and 13-docosenyl group.

Examples of the branched alkenyl groups include 3-methyl-2-nonenyl group, 2,4-dimethyl-2-decenyl group, 2-methy-9-octadecenyl group and 2,2-dimethyl-11-elcosenyl group.

The alkyl groups and alkenyl groups described above each has 9 to 22 carbon atoms, and the branched alkyl groups, alkyl groups each having a cycloalkyl moiety and branched alkenyl groups, among these alkyl groups and alkenyl groups, each usually has 10 to 22 carbon atoms. Further, the alkyl groups and alkenyl groups described above each has preferably 10 to 22 carbon atoms, still more preferably 13 to 21 carbon atoms, and particularly preferably 13 to 17 carbon atoms.

Compounds represented by formulas (I), (II) and (III) of which alkyl or alkenyl moiety has 13 to 21 carbon atoms can be produced by using, as the raw materials, natural materials which are available at inexpensive cost. In addition, from the viewpoint of the wear-reducing ability, R, $R_1$, $R_2$ and $R_3$ in formulas (I), (II) and (III) are each preferably a linear alkyl or alkenyl group, and still more preferably a linear alkyl group. For satisfying both the solubility thereof to gas oils and the more excellent ability for reducing wear of metallic surfaces, it is preferred to use, as glycerides constituting the mixture described above as the gas oil additive, 1) a mixture, as compounds represented by formula (I), of a monoglyceride wherein R is a linear alkyl group having 13 to 21, desirably 13 to 17 carbon atoms, and the other monoglyceride wherein R is a linear alkenyl group having 13 to 21, desirably 13 to 17 carbon atoms;

2) a diglyceride wherein one of two R's is a linear alkyl group having 13 to 21, desirably 13 to 17 carbon atoms, and the other is a linear alkenyl group having 13 to 21, desirably 13 to 17 carbon atoms, as the compound represented by formula (II);

3) a mixture, as compounds represented by formula (II), of a diglyceride wherein R is a linear alkyl group having 13 to 21, desirably 13 to 17 carbon atoms, and the other diglyceride wherein R is a linear alkenyl group having 13 to 21, desirably 13 to 17 carbon atoms;

4) a triglyceride wherein one or two of $R_1$, $R_2$ and $R_3$ is(are) each a linear alkyl group having 13 to 21, desirably 13 to 17 carbon atoms, and the other(s) is(are) each a linear alkenyl group having 13 to 21, desirably 13 to 17 carbon atoms, as the compound represented by formula (III);

5) a mixture, as compounds represented by formula (III), of a triglyceride wherein $R_1$, $R_2$ and $R_3$ are each a linear alkyl group having 13 to 21, desirably 13 to 17 carbon atoms, and the other diglyceride wherein $R_1$, $R_2$ and $R_3$ are each a linear alkenyl group having 13 to 21, desirably 13 to 17 carbon atoms; or the like.

The mixture as a gas oil additive has such a fatty acid residue composition of the compounds constituting the mixture, based on the total weight of the fatty acids originating from acyl groups in the compounds represented by formulas (I), (II) and (III), preferably that an unsaturated fatty acid(s) having one double bond is 75 to 85% by weight, an unsaturated fatty acid(s) having two double bonds is 5 to 10% by weight and a saturated fatty acid(s) is 5 to 20% by weight; still more preferably that the above-described unsaturated fatty acid(s) having one double bond is at least one member selected among those having 14 carbon atoms, having 16 carbon atoms and having 18 carbon atoms, the above-described unsaturated fatty acid(s) having two double bonds is at least one member selected among those having 18 carbon atoms and the above-described saturated fatty acid(s) is at least one member selected among those having 14 carbon atoms, having 16 carbon atoms and having 18 carbon atoms; particularly preferably that 9-octadecenoic acid is 68 to 78% by weight. That is, the fatty acid residue composition is determined by calculating the acyl groups (fatty acid residues, $R_aCO-$) in the compounds represented by the formulas (I), (II) and (III) as fatty acids ($R_aCOOH$).

While, from the viewpoints of the wear-reducing ability and the solubility to gas oils at low temperatures, in the mixture described above as a gas oil additive, the weight ratio of the monoglyceride to the diglyceride is 0.25 to 4.0, preferably 0.5 to 4.0, and still more preferably 1.0 to 2.5.

In the mixture as a gas oil additive according to the present invention, when it is a mixture of a monoglyceride, a diglyceride and a triglyceride, the total weight of the monoglyceride and the diglyceride is not less than 80% by weight and less than 100% by weight, and preferably not less than 90% by weight and less than 100% by weight; and the triglyceride is more than 0% by weight and 20% by weight or less, preferably more than 0% by weight and 15% by weight or less, and still more preferably more than 0% by weight and 10% by weight or less.

In the mixture as a gas oil additive according to the present invention, when it is a mixture of a monoglyceride, a diglyceride, a triglyceride and glycerol, the total weight of the monoglyceride and the diglyceride is not less than 80% by weight and less than 100% by weight, and preferably not less than 90% by weight and less than 100% by weight; the triglyceride is more than 0% by weight and 20% by weight or less, preferably more than 0% by weight and 15% by weight or less, and still more preferably more than 0% by weight and 10% by weight or less, and the glycerol is preferably more than 0% by weight and 5% by weight or less, still more preferably more than 0% by weight and 2.5% by weight or less, and particularly preferably more than 0% by weight and 1% by weight or less, base on the total weight of the monoglyceride, the diglyceride, the triglyceride and the glycerol.

The triglyceride has a poor adsorptivity to metal, and, therefore, it is not to say that the triglyceride is excellent in wear-reducing ability or wear-preventing performance. Accordingly, the content of the triglyceride is restricted to such one described above. Further, the unreacted glycerol has no wear-reducing effect or wear-preventing effect in itself, and rather checks the wear-reducing effect of the monoglyceride and diglyceride. In addition, the glycerol has a low solubility to gas oils. Accordingly, the content of the glycerol is restricted to such one described above.

The amount of the mixture as a gas oil additive to be added to gas oil is not specifically restricted. It may be used in such an amount as to satisfactorily reduce the wear of metal during the gas oil composition containing the gas oil additive contacts to the surface of the metal. Specially, it is preferable to use a gas oil additive in an amount such that the total of the monoglyceride and the diglyceride described above is 0.001 to 0.1 part by weight, particularly 0.001 to 0.01 part by weight, based on 100 parts by weight of a gas oil. When the amount of the gas oil additive is in this range, its wear-preventing effect is satisfactorily exhibited, and it is economically advantageous.

Although the mixture as a gas oil additive used in the gas oil composition of the present invention may be a commercially available one, it is preferable to use the one produced by the following process.

Thus, glycerol is esterified with at least one member selected from the group consisting of a saturated linear fatty acid having 10 to 23 carbon atoms, a saturated branched fatty acid having 10 to 23 carbon atoms, a saturated fatty acid having a cycloalkyl moiety and having 10 to 23 carbon atoms in total, an unsaturated (double bond) linear fatty acid having 10 to 23 carbon atoms and an unsaturated (double bond) branched fatty acid having 10 to 23 carbon atoms. The fatty acids used are preferably those each having 11 to 23 carbon atoms, still more preferably those each having 14 to 22 carbon atoms, and particularly preferably those each having 14 to 18 carbon atoms. In this specification, "a saturated fatty acid having a cycloalkyl moiety and having 10 to 23 carbon atoms in total" refers to a monohydric carboxylic acid containing a cycloalkyl group therein and having 10 to 23 carbon atoms in total.

Generally, a fatty acid mixture is used as a fatty acid as a raw material. The fatty acid mixture is preferably a mixture comprising, based on the total weight of the mixture, 75 to 85% by weight of an unsaturated fatty acid having one double bond, 5 to 10% by weight of an unsaturated fatty acid having two double bonds and 5 to 20% by weight of a saturated fatty acid; still more preferably a mixture comprising, based on the total weight of the mixture, 75 to 85% by weight of an unsaturated fatty acid having one double bond and having 14, 16 or 18 carbon atoms, 5 to 10% by weight of an unsaturated fatty acid having two double bonds and having 18 carbon atoms, and 5 to 20% by weight of a saturated fatty acid having 14, 16 or 18 carbon atoms; and particularly preferably a mixture comprising, based on the total weight of the mixture, 68 to 78% by weight of 9-octadecenoic acid.

With respect to the amounts of the raw materials used, the fatty acid is used preferably 0.7 to 2 moles, still more preferably 0.9 to 2 moles and particularly preferably 0.9 to 1.3 moles, per mole of glycerol.

The manner of the reaction of glycerol with a fatty acid is not specifically restricted. The reaction may be batch wise or continuous. Further, examples of the manners for feeding raw materials include one comprising feeding them together before the start of the reaction and another one comprising feeding them successively, and the manner is not specifically restricted in the present invention.

The reaction described above may be effected in the presence of a solvent. The solvent usable is one inactive to the reaction, and examples thereof include aromatic compounds such as benzene, toluene and xylene, and saturated hydrocarbons, though depending on the reaction temperature.

In order to accelerate the reaction, acid catalysts such as sulfuric acid and p-toluenesulfonic acid, or metal catalysts such as tin oxide and tetraphenoxytitanium can be used as well. The catalyst is used in an amount of, e.g., 0.01 to 10% by weight based on the weight of the fatty acid, though the amount varies depending on the reaction manner.

The reaction temperature is usually 100° to 300° C., preferably 100° to 250° C., though it varies depending on the reaction manner, the amount of the catalyst, and the kinds of the raw materials.

The reaction pressure is not specifically restricted, and it may be effected under atmospheric pressures or under a reduced pressure.

The reaction time, which varies depending on the kinds of the raw materials, the amount of the catalyst and the kind of the catalyst, is usually about 1 to 100 hours.

In some case, a step of removing water and/or the solvent from the reaction mixture is necessitated during or after the esterification. In such a case, the water and/or the solvent is(are) recovered by distillation. When a solid matter is present in the reaction mixture, the solid matter is removed by filtering or centrifuging the reaction mixture, if necessary.

A method for obtaining resulting glycerides from the reaction mixture after the completion of the reaction is not specifically restricted. For example, in the case where a catalyst is used, glyceride can be obtained by operations comprising filtering the reaction mixture to remove the catalyst, and distilling the resulting filtrate. In the case where the filtrate is difficult to pass through the filter in filtering the reaction mixture comprising the catalyst, a filtering aid can be used.

Further, as described above, the unreacted glycerol may deteriously affect, in some cases, the performance for preventing the wear of metals that the gas oil additive used in the present invention has. Therefore, it is preferable to reduce the glycerol content to a given amount or less by, e.g., distilling the reaction mixture after the completion of the reaction.

The gas oil composition of the present invention may further comprise various supplementary additives. Examples of such additives include antioxidants, conductivity improvers, metal deactivators, freezing-controlling additives, cetane number improvers, combustion improvers (including smoke controllers), surfactants, dispersants, manifold system detergents, corrosion inhibitors, demulsifiers, top cylinder lubricants, and dyes.

Among the antioxidants, phenolic antioxidants are suitably used. However, gas oil soluble antioxidants other than phenolic antioxidants can also be used. Examples of the suitable antioxidants other than phenolic antioxidants include amine antioxidants, phosphates, sulfur-containing antioxidants, and other similar substances. The amount of the antioxidant is preferably about 2.8 to 28 g per 1000 liter of the gas oil composition. However, it is provided according the necessity, and is not restricted within this range.

The conductivity improver is to be dissolved in the gas oil composition in order to elevate the conductivity of the gas oil composition to be in a suitable range, for example, to be in a range of about 50 to 600 ps/m as measured according to ASTM D-2624. The addition amount thereof is preferably about 5 to 50 g per 1000 liters of the gas oil composition.

Examples of the metal deactivator includes N,N'-disalicylidene-1,2-propanediamine, N,N'-disalicylidene-1,2-cyclohexanediamine, N,N'-disalicylidene-1,2-ethanediamine, N,N"-disalicylidene-N'-methyldipropylenetriamine, 8-hydroxyquinoline, ethylenediaminetetracarboxylic acid, acetylacetone, octylacetoacetate, and substances similar thereto. The addition amount of the metal deactivator is sufficient usually in an amount of about 5.6 g or less per 1000 liters of the gas oil composition. However, it may also be used in an enhanced amount for giving a higher concentration, according to necessity.

Examples of the anti-freeze additives include alcohols, glycols, and monocarboxylic acid esters of polyalkylene glycols. The addition amount thereof is sufficient usually in an amount of about 140 g or less per 1000 liters of the gas oil composition.

Examples of the surfactants and dispersants include amides and imides, particularly succinimide; mono- and polycarboxylic acid esters, particularly succinic acid esters; carbamates; hydrocarbylpolyamines; and hydrocarbylpolyetherpolyamines.

By using the gas oil composition of the present invention, the reduction of the wear of metals can be attained in the metallic surfaces the gas oil composition contacts.

EXAMPLES

The present invention will now be illustrated with reference to examples, though the present invention will not be restricted to the following examples.

Production examples 460 g (5.0 moles) of glycerol and 1412.4 g (5.0 moles) of 9-octadecenoic acid were weighed and put into a 5000 ml flask equipped with a stirrer, a thermometer, a nitrogen introducing tube, and a dehydrator having a condenser. They were subjected to an esterification reaction at 240° C. for 10 hours under nitrogen flow to thereby give glyceride A. Glycerides B to R were prepared in the same manner as that described above, except that fatty acids shown in Table 1 were used instead of 9-octadecenoic acid and that the molar ratios of the raw materials fed were varied as those given in Table 1.

In Table 1, analytical results of the resulting glycerides A to R and commercially available products by gel permeation chromatography (GPC) with respect to mono-, di- and triglyceride and glycerol are also shown.

TABLE 1

| Glyceride | Fatty acid composition (by weight) | Ratio between raw materials fatty acid/glycerol (by mole) | Composition of glycerides (% by weight) | | | | Ratio of monoglyceride to diglyceride |
|---|---|---|---|---|---|---|---|
| | | | Mono-glyceride | Di-glyceride | Tri-glyceride | Glycerol | |
| A | 9-Octadecenoic acid | 1.0 | 56.6 | 37.4 | 4.9 | 1.1 | 1.51 |
| B | Octadecanoic acid | 1.0 | 51.2 | 43.5 | 4.3 | 1.0 | 1.18 |
| C | Decanoic acid | 1.0 | 57.2 | 35.6 | 5.2 | 2.0 | 1.61 |
| D | Docosanoic acid | 1.0 | 48.3 | 43.9 | 6.3 | 1.5 | 1.10 |
| E | 2,4,6-Trimethylheptanoic acid | 1.0 | 59.2 | 33.9 | 5.1 | 1.8 | 1.75 |
| F | 2-(3'-Methylhexyl)-7-methyl-decanoic acid | 1.0 | 57.5 | 35.3 | 5.2 | 2.0 | 1.63 |
| G | 9-Decenoic acid | 1.0 | 58.1 | 33.9 | 5.8 | 2.2 | 1.71 |
| H | 13-Docosenoic acid | 1.0 | 49.2 | 41.7 | 7.0 | 2.1 | 1.18 |
| I | 9-Octadecenoic acid/11-eicosenoic acid/13-docosenoic acid (40/15/45) | 1.0 | 52.6 | 35.7 | 9.2 | 2.5 | 1.47 |

TABLE 1-continued

| Glyceride | Fatty acid composition (by weight) | Ratio between raw materials fatty acid/glycerol (by mole) | Composition of glycerides (% by weight) | | | | Ratio of monoglyceride to diglyceride |
|---|---|---|---|---|---|---|---|
| | | | Mono-glyceride | Di-glyceride | Tri-glyceride | Glycerol | |
| J | 9-Octadecenoic acid/11-eicosenoic acid/13-docosenoic acid (40/15/45) | 2.0 | 31.5 | 52.1 | 14.2 | 2.2 | 0.60 |
| K | Tetradecanoic acid/hexadecanoic acid/octadecanoic acid/5-tetradedecenoic acid/7-hexadecenoic acid/9-octadecenoic acid/9,12-octadecadienoic acid (3/6/1/3/7/72/8) | 1.0 | 57.0 | 37.1 | 5.0 | 0.9 | 1.54 |
| L | Same fatty acid as K | 2.0 | 32.1 | 52.8 | 14.2 | 0.9 | 0.61 |
| M | Same fatty acid as K | 1.0 | 56.3 | 36.2 | 4.3 | 3.2 | 1.56 |
| P | Same fatty acid as H | 0.96 | 72.1 | 24.3 | 2.7 | 0.9 | 2.97 |
| Q | 9-Octadecenoic acid/octadecanoic acid/9,12-octadecadienoic acid (76/15/9) | 1.0 | 58.1 | 38.3 | 3.2 | 0.4 | 1.52 |
| R | 9-Octadecenoic acid/octadecanoic acid (80/20) | 1.0 | 59.3 | 38.5 | 1.6 | 0.6 | 1.54 |
| N | Same fatty acid as K | 3.33 | 1.1 | 8.1 | 90.0 | 0.8 | 0.14 |
| O | Same fatty acid as J | 2.08 | 22.0 | 50.8 | 25.0 | 2.2 | 0.43 |
| Commercially available monoglyceride (commercial product 1) | | | 82.2 | 14.2 | 1.6 | 2.0 | 5.79 |
| Commercially available diglyceride (commercial product 2) | | | 27.7 | 57.9 | 13.7 | 0.7 | 0.48 |
| Commercially available triglyceride (commercial product 3) | | | 0.5 | 7.8 | 90.5 | 1.2 | 0.06 |
| Commercially available glycerol (commercial product 4) | | | 0 | 0 | 0 | 100 | — |

Examples 1 to 20 and Comparative Examples 1 to 7

Glycerides A to R prepared in production examples and commercial products 1 to 4 were each added to a low-sulfur gas oil having a sulfur content of 0.04% by weight in an amount shown in Table 2 per 100 parts by weight of the gas oil, and the resulting gas oil composition were subjected to a standard test known as a ball-lubricity evaluation test using a cylinder. This test was effected based on ASTM D 5001-90. In this test, scar diameters are measured, and the smaller the scar diameter is, the more effective the gas oil additive is to wear reduction. In order to make sure that these gas oil compositions had excellent storage stabilities, the compositions were stored at 25° C. for one month under a surrounding light condition prior to carrying out the ball-lubricity evaluation test. As a result, it was confirmed that the formation of precipitates, deterioration by oxidation, discoloration and the like were not observed in the compositions. The low-sulfur gas oil used as a base and a commercially available gas oil having a sulfur content of 0.2% by weight were subjected to the same test.

The wear-reducing abilities of the invention and comparative gas oil compositions, and gas oils are shown in Table 2. The gas oil compositions each containing a gas oil additive wherein the total amount of a monoglyceride(s) and a diglyceride(s) is 80% by weight or more based on the total amount of the gas oil additive and the weight ratio of the monoglyceride(s) to the diglyceride(s) is 0.25 to 4.0, have the scar diameters of from 0.31 to 0.55 mm and show excellent wear-reducing abilities. The comparative gas oil compositions and gas oils have the scar diameters of from 0.53 to 0.82 mm and are inferior in the wear-reducing ability to the invention compositions.

TABLE 2

| | Glyceride | Sulfur content of gas oil (% by weight) | Amount* of glyceride added (parts by weight) | Total amount of mono- and di-glyceride (parts by weight) | Scar diameter (mm) |
|---|---|---|---|---|---|
| Example 1 | A | 0.04 | 0.002 | 0.00188 | 0.52 |
| Example 2 | A | 0.04 | 0.005 | 0.00470 | 0.46 |
| Example 3 | A | 0.04 | 0.01 | 0.00940 | 0.40 |
| Example 4 | B | 0.04 | 0.005 | 0.00474 | 0.45 |
| Example 5 | C | 0.04 | 0.005 | 0.00464 | 0.46 |
| Example 6 | D | 0.04 | 0.005 | 0.00461 | 0.47 |
| Example 7 | E | 0.04 | 0.005 | 0.00466 | 0.42 |
| Example 8 | F | 0.04 | 0.005 | 0.00464 | 0.49 |
| Example 9 | G | 0.04 | 0.005 | 0.00460 | 0.41 |
| Example 10 | H | 0.04 | 0.005 | 0.00455 | 0.51 |
| Example 11 | I | 0.04 | 0.005 | 0.00442 | 0.50 |
| Example 12 | J | 0.04 | 0.005 | 0.00418 | 0.50 |
| Example 13 | K | 0.04 | 0.002 | 0.00188 | 0.40 |
| Example 14 | K | 0.04 | 0.005 | 0.00471 | 0.31 |
| Example 15 | L | 0.04 | 0.005 | 0.00425 | 0.53 |
| Example 16 | M | 0.04 | 0.005 | 0.00463 | 0.54 |
| Example 17 | Commercial product 2 | 0.04 | 0.005 | 0.00428 | 0.55 |
| Example 18 | P | 0.04 | 0.005 | 0.00482 | 0.40 |
| Example 19 | Q | 0.04 | 0.005 | 0.00482 | 0.35 |
| Example 20 | R | 0.04 | 0.005 | 0.00489 | 0.43 |
| Comp. Ex. 1 | N | 0.04 | 0.005 | 0.00046 | 0.73 |
| Comp. Ex. 2 | O | 0.04 | 0.005 | 0.00364 | 0.55 |
| Comp. Ex. 3 | None | 0.04 | 0 | 0 | 0.82 |
| Comp. Ex. 4 | None | 0.2 | 0 | 0 | 0.65 |
| Comp. Ex. 5 | Commercial | 0.04 | 0.005 | 0.00482 | 0.53 |

TABLE 2-continued

|  | Glyceride | Sulfur content of gas oil (% by weight) | Amount* of glyceride added (parts by weight) | Total amount of mono- and di- glyceride (parts by weight) | Scar diameter (mm) |
|---|---|---|---|---|---|
|  | product 1 |  |  |  |  |
| Comp. Ex. 6 | Commercial product 3 | 0.04 | 0.005 | 0.00042 | 0.78 |
| Comp. Ex. 7 | Commercial product 4 | 0.04 | 0.005 | 0 | 0.80 |

Note)
*It is an amount of a mixture of monoglyceride, diglyceride, triglyceride and glycerol (the same will be applied hereinafter).

Examples 21 to 40 and Comparative Examples 8 to 13

A Falex test described in ASTM D 2670-81 was performed in order to investigate the wear-reducing abilities of glycerides A to M, O, P, Q and R, and commercial products 1 to 4. V blocks and pins were immersed in each of the compositions used in Examples 1 to 20 and Comparative Examples 2, 5, 6 and 7, and they were rotated for 10 minutes without applying load. Subsequently, after preliminary rotation at 100 lb for 5 minutes, V blocks and pins were further rotated at 150 lb for 3 hours. After stopping the rotation, the wear amounts of the V blocks and the pins were investigated. Further, the low-sulfur gas oil (Comparative Example 3) used as a base and a commercially available gas oil (Comparative Example 4) having a sulfur content of 0.2% by weight were also subjected to the same test. The results thereof are shown in Table 3. The test temperature was 25° C. when starting the test and then elevated to 45° to 50° C. due to frictional heat during testing.

In spite of the elevation of the temperature due to frictional heat as described above, the wear amounts of the V blocks and the pins were from 12.3 to 27.6 mg when the gas oil compositions of the present invention were used, and it shows that the gas oil compositions of the present invention have excellent wear-reducing abilities. Among them, the composition using glyceride K has the most excellent wear-reducing ability. On the other hand, the wear amounts of the V blocks and the pins in Comparative Examples were from 20.9 to 38.0 mg, and it is understood that the comparative compositions and gas oils were inferior in the wear-reducing abilities to the gas oil compositions of the present invention.

TABLE 3

|  | Glyceride | Sulfur content of gas oil (% by weight) | Amount of glyceride added (parts by weight) | Wear amount (mg) |
|---|---|---|---|---|
| Example 21 | A | 0.04 | 0.002 | 27.6 |
| Example 22 | A | 0.04 | 0.005 | 20.3 |
| Example 23 | A | 0.04 | 0.01 | 14.2 |
| Example 24 | B | 0.04 | 0.005 | 16.2 |
| Example 25 | C | 0.04 | 0.005 | 19.3 |
| Example 26 | D | 0.04 | 0.005 | 21.5 |
| Example 27 | E | 0.04 | 0.005 | 17.0 |
| Example 28 | F | 0.04 | 0.005 | 22.9 |
| Example 29 | G | 0.04 | 0.005 | 16.1 |
| Example 30 | H | 0.04 | 0.005 | 19.4 |
| Example 31 | I | 0.04 | 0.005 | 18.4 |
| Example 32 | J | 0.04 | 0.005 | 18.9 |

TABLE 3-continued

|  | Glyceride | Sulfur content of gas oil (% by weight) | Amount of glyceride added (parts by weight) | Wear amount (mg) |
|---|---|---|---|---|
| Example 33 | K | 0.04 | 0.002 | 15.1 |
| Example 34 | K | 0.04 | 0.005 | 12.3 |
| Example 35 | L | 0.04 | 0.005 | 24.1 |
| Example 36 | M | 0.04 | 0.005 | 27.3 |
| Example 37 | Commercial product 2 | 0.04 | 0.005 | 23.1 |
| Example 38 | P | 0.04 | 0.005 | 14.1 |
| Example 39 | Q | 0.04 | 0.005 | 13.5 |
| Example 40 | R | 0.04 | 0.005 | 15.9 |
| Comp. Ex. 8 | O | 0.04 | 0.005 | 20.9 |
| Comp. Ex. 9 | None | 0.04 | 0 | 38.0 |
| Comp. Ex. 10 | None | 0.2 | 0 | 32.3 |
| Comp. Ex. 11 | Commercial product 1 | 0.04 | 0.005 | 21.2 |
| Comp. Ex. 12 | Commercial product 3 | 0.04 | 0.005 | 34.5 |
| Comp. Ex. 13 | Commercial product 4 | 0.04 | 0.005 | 37.3 |

Examples 41 to 60 and Comparative Examples 14 to 19

A Soda type pendulum test was performed in order to investigate the lubricities of glycerides A to M, O, P, Q and R, and commercial products 1 to 4. Balls and pins were immersed in each of the compositions used in Examples 1 to 20 and Comparative Examples 2, 5, 6 and 7, and friction coefficients were determined from the attenuation factors of the pendulum. Further, the low-sulfur gas oil (Comparative Example 3) used as a base and a commercially available gas oil (Comparative Example 4) having a sulfur content of 0.2% by weight were also subjected to the same test. The results thereof are shown in Table 4. The lower the friction coefficient, the more effective the lubricity. The test temperature was 25° C. when starting the test.

The friction coefficients were from 0.185 to 0.273 when the gas oil compositions of the present invention were used, and it shows that the gas oil compositions of the present invention have excellent lubricities. Among them, the composition using glyceride K has the most excellent lubricity. On the other hand, the friction coefficients in Comparative Examples were from 0.265 to 0.358, and it is understood that the comparative compositions and gas oils were inferior in the lubricities to the gas oil compositions of the present invention.

TABLE 4

|  | Glyceride | Sulfur content of gas oil (% by weight) | Amount of glyceride added (parts by weight) | Friction coefficient |
|---|---|---|---|---|
| Example 41 | A | 0.04 | 0.002 | 0.225 |
| Example 42 | A | 0.04 | 0.005 | 0.215 |
| Example 43 | A | 0.04 | 0.01 | 0.204 |
| Example 44 | B | 0.04 | 0.005 | 0.211 |
| Example 45 | C | 0.04 | 0.005 | 0.208 |
| Example 46 | D | 0.04 | 0.005 | 0.220 |
| Example 47 | E | 0.04 | 0.005 | 0.236 |
| Example 48 | F | 0.04 | 0.005 | 0.215 |
| Example 49 | G | 0.04 | 0.005 | 0.246 |
| Example 50 | H | 0.04 | 0.005 | 0.251 |
| Example 51 | I | 0.04 | 0.005 | 0.215 |
| Example 52 | J | 0.04 | 0.005 | 0.260 |

TABLE 4-continued

|  | Glyceride | Sulfur content of gas oil (% by weight) | Amount of glyceride added (parts by weight) | Friction coefficient |
|---|---|---|---|---|
| Example 53 | K | 0.04 | 0.002 | 0.201 |
| Example 54 | K | 0.04 | 0.005 | 0.185 |
| Example 55 | L | 0.04 | 0.005 | 0.261 |
| Example 56 | M | 0.04 | 0.005 | 0.273 |
| Example 57 | Commercial product 2 | 0.04 | 0.005 | 0.258 |
| Example 58 | P | 0.04 | 0.005 | 0.201 |
| Example 59 | Q | 0.04 | 0.005 | 0.101 |
| Example 60 | R | 0.04 | 0.005 | 0.202 |
| Comp. Ex. 14 | O | 0.04 | 0.005 | 0.295 |
| Comp. Ex. 15 | None | 0.04 | 0 | 0.358 |
| Comp. Ex. 16 | None | 0.2 | 0 | 0.325 |
| Comp. Ex. 17 | Commercial product 1 | 0.04 | 0.005 | 0.265 |
| Comp. Ex. 18 | Commercial product 3 | 0.04 | 0.005 | 0.332 |
| Comp. Ex. 19 | Commercial product 4 | 0.04 | 0.005 | 0.342 |

[Studies of the test results]

1) The ratios between components constituting gas oil additives

As is apparent from the following Table 5, the wear-reducing ability is poor in the case where glyceride M having a glycerol content of 3.2% by weight is used, as compared with the case where glyceride K having a glycerol content of 0.9% by weight is used. Further, as is apparent from the comparison of the Example using glyceride J with the comparative Example using glyceride O, the gas oil additive has a poor wear-reducing effect in the case where the total amount of a monoglyceride(s) and a diglyceride(s) is less than 80% by weight based on the amount of the gas oil additive (i.e., the total amount of a monoglyceride(s), a diglyceride(s), a triglyceride(s) and glycerol). Therefore, it is understood that those contributing the wear-reducing ability are monoglycerides and digylcerides.

TABLE 5

| Glyceride | Composition of glycerides (% by weight) | | | | Scar diameter (mm) | Wear amount (mg) | Friction coefficient |
|---|---|---|---|---|---|---|---|
|  | Mono-glyceride | Di-glyceride | Tri-glyceride | Glycerol |  |  |  |
| K | 57.0 | 37.1 | 5.0 | 0.9 | 0.31 | 12.3 | 0.183 |
| M | 56.3 | 36.2 | 4.3 | 3.2 | 0.54 | 27.3 | 0.273 |
| J | 31.5 | 52.1 | 14.2 | 2.2 | 0.50 | 18.9 | 0.260 |
| O | 22.0 | 50.8 | 25.0 | 2.2 | 0.55 | 20.9 | 0.295 |

Note)
Examples in Table 5 are those each containing 0.005 part by weight of a glyceride per 100 parts by weight of a gas oil.

2) The ratio of monoglyceride to diglyceride

As is apparent from the following Table 6, in the case where the ratio of a monoglyceride(s) to a diglyceride(s) is less than 1.0, the wear-reducing effect is to be poor according to the reduction of the ratio. In particular, in the case where the ratio is 0.25 or less (glyceride N and commercial product 3), the wear-reducing effect thereof is extremely poor. On the other hand, in the case where the ratio of a monoglyceride(s) to a diglyceride(s) is more than 4 (commercial product 1) as well, the wear-reducing effect is poor. Thus, the gas oil additive shows an excellent wear-reducing effect in the case where the ratio of a monoglyceride(s) to a diglyceride(s) is from 1.0 to 2.5, and shows the most excellent wear-reducing effect in the case where the ratio is 1.5 (glyceride K).

TABLE 6

| Glyceride | Weight ratio (monoglyceride/ diglyceride) | Scar diameter (mm) | Wear amount (mg) | Friction coefficient |
|---|---|---|---|---|
| Commercial product 1 | 5.78 | 0.53 | 21.2 | 0.265 |
| P | 2.97 | 0.40 | 14.1 | 0.201 |
| K | 1.54 | 0.31 | 12.3 | 0.185 |
| I | 1.47 | 0.50 | 18.4 | 0.215 |
| J | 0.60 | 0.50 | 18.9 | 0.260 |
| Commercial product 2 | 0.48 | 0.55 | 23.1 | 0.258 |
| N | 0.14 | 0.73 | — | — |
| Commercial product 3 | 0.06 | 0.78 | 34.5 | 0.332 |

Note)
Examples in Table 6 are those each containing 0.005 part by weight of a glyceride per 100 parts by weight of a gas oil.

3) The composition of fatty acid residues

As is apparent from the following Table 7, in the case where two or more fatty acid residues are present (glycerides I, K, Q and R) in the glycerides constituting the gas oil additive, the wear-reducing effect is more excellent, as compared with the case where only one fatty acid residue is present (glycerides A and B). In particular, in the case where a saturated fatty acid residue(s) and a unsaturated fatty acid residue(s) are present (glycerides K, Q and R), the effect is excellent, and, further, in the case where the glyceride has an specific fatty acid residue composition (glycerides K and Q), the most excellent wear-reducing effect is exhibited.

The reason why the glyceride having an specific fatty acid residue composition exhibits the most excellent wear-reducing effect is considered as follows: From only the viewpoint of the wear-reducing effect, glycerides having a linear saturated fatty acid residue(s) are preferable. However, when the solubility of the glyceride in the gas oil is taken into consideration, those having a unsaturated fatty acid residue(s) are superior thereto.

TABLE 7

| Glyceride | Fatty acid (as raw material) composition (by weight) | Scar diameter (mm) | Wear amount (mg) | Friction coefficient |
|---|---|---|---|---|
| A | 9-Octadecenoic acid | 0.46 | 20.3 | 0.215 |
| B | Octadecanoic acid | 0.45 | 16.2 | 0.211 |
| I | 9-Octadecenoic acid/11-eicosenoic acid/13-docosenoic | 0.50 | 18.4 | 0.215 |

TABLE 7-continued

| Glyceride | Fatty acid (as raw material) composition (by weight) | Scar diameter (mm) | Wear amount (mg) | Friction coefficient |
|---|---|---|---|---|
| | acid (40/15/45) | | | |
| K | Tetradecanoic acid/ hexadecanoic acid/ octadecanoic acid/5-tetradedecenoic acid/7-hexadecenoic acid/9-octadecenoic acid/9,12-octadecadienoic acid (3/6/1/3/7/72/8) | 0.31 | 12.3 | 0.185 |
| Q | 9-octadecenoic acid/ octadecanoic acid/9,12-octadecadienoic acid (76/15/9) | 0.35 | 13.5 | 0.191 |
| R | 9-octadecenoic acid/ octadecanoic acid (80/20) | 0.43 | 15.9 | 0.202 |

Note)
Examples in Table 7 are those each containing 0.005 part by weight of a glyceride per 100 parts by weight of a gas oil.

What is claimed is:

1. A low sulfur content gas oil fuel composition comprising a low sulfur gas oil; and a first compound represented by the following formula (I), a second compound represented by the following formula (II) and a third compound represented by the following formula (III), wherein the total amount of the compounds represented by formulas (I) and (II) is not less than 80% by weight and less than 100% by weight based on the total weight of the compounds represented by formulas (I), (II) and (III) wherein the total amount of the compounds represented by formulas (I) and (II) is 0.001 to 0.1 part by weight based on 100 parts by weight of the low-sulfur gas oil; and the weight ratio of the compound represented by formula (I) to the compound represented by formula (II) is 0.5 to 4.0:

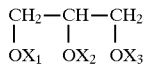  (I)

wherein $X_1$, $X_2$ and $X_3$ each represents a hydrogen atom or a group represented by the formula: RCO-, wherein R represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms, two of $X_1$, $X_2$ and $X_3$ are hydrogen atoms, and one of $X_1$, $X_2$ and $X_3$ is a group represented by the formula: RCO-, wherein R is defined above;

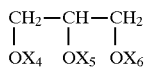  (II)

wherein $X_4$, $X_5$ and $X_6$ each represents a hydrogen atom or a group represented by the formula: RCO-, wherein R is as defined above; one of $X_4$, $X_5$ and $X_6$ is a hydrogen atom, and two of $X_4$, $X_5$ and $X_6$ are each a group represented by the formula: RCO-, wherein R is as defined above; and 0 to 15% by weight of

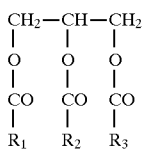  (III)

wherein $R_1$, $R_2$ and $R_3$ each represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms; and wherein the amount of sulfur in said composition is 0.05% by weight or less.

2. A low sulfur content gas oil fuel composition comprising a low sulfur gas oil; and a first compound represented by the following formula (I), a second compound represented by the following formula (II), a third compound represented by the following formula (III) and a fourth compound represented by the formula (IV), wherein the total amount of the compounds represented by formulas (I) and (II) is not less than 80% by weight and less than 100% by weight based on the total weight of the compounds represented by formulas (I), (II), (III) and (IV) and wherein the total amount of the compounds represented by formulas (I) and (II) is 0.001 to 0.1 part by weight based on 100 parts by weight of the low-sulfur gas oil; and the weight ratio of the compound represented by formula (I) to the compound represented by formula (II) is 0.5 to 4.0:

  (I)

wherein $X_1$, $X_2$ and $X_3$ each represents a hydrogen atom or a group represented by the formula: RCO-, wherein R represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms, two of $X_1$, $X_2$ and $X_3$ are hydrogen atoms, and one of $X_1$, $X_2$ and $X_3$ is a group represented by the formula: RCO-, wherein R is defined above;

  (II)

wherein $X_4$, $X_5$ and $X_6$ each represents a hydrogen atom or a group represented by the formula: RCO-, wherein R is as defined above; one of $X_4$, $X_5$ and $X_6$ is a hydrogen atom, and two of $X_4$, $X_5$ and $X_6$ are each a group represented by the formula: RCO-, wherein R is as defined above; 0 to 15% by weight of

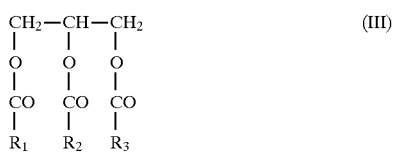  (III)

wherein $R_1$, $R_2$ and $R_3$ each represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms; and 0 to 2.5% by weight of

  (IV)

and wherein the amount of sulfur in said composition is 0.05% by weight or less.

3. A method for reducing the wear of metallic surfaces in a gas oil diesel engine, which comprises adding the low-sulfur content gas oil composition according to claim 1 or 2 to a gas oil diesel engine.

4. The composition according to claim 1 or 2, which has such a fatty acid residue composition that an unsaturated fatty acid(s) having one double bond is 75 to 85% by weight, an unsaturated fatty acid(s) having two double bonds is 5 to 10% by weight and a saturated fatty acid(s) is 5 to 20% by weight, based on the total weight of the fatty acids originating from acyl groups in the compounds represented by formulas (I), (II) and (III).

5. The composition according to claim 1 or 2, which has such a fatty acid residue composition that 9-octadecenoic acid is 68 to 78% by weight, based on the total weight of the fatty acids originating from acyl groups in the compounds represented by formulas (I), (II) and (III).

6. The composition according to claim 2, wherein the amount of the compound represented by formula (IV) is more than 0% by weight and 2.5% by weight or less, based on the total weight of the compounds represented by formulas (I), (II), (III) and (IV).

7. A gas oil additive composition comprising a mixture of a first compound represented by the following formula (I), a second compound represented by the following formula (II) and a third compound represented by the following formula (III) as an additive, wherein the total amount of the compounds represented by formulas (I) and (II) is not less than 80% by weight and less than 100% by weight based on the total weight of the compounds represented by formulas (I), (II) and (III); and the weight ratio of the compound represented by formula (I) to the compound represented by formula (II) is 0.5 to 4.0:

wherein $X_1$, $X_2$ and $X_3$ each represents a hydrogen atom or a group represented by the formula: RCO-, wherein R represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms, two of $X_1$, $X_2$ and $X_3$ are hydrogen atoms, and one of $X_1$, $X_2$ and $X_3$ is a group represented by the formula: RCO-, wherein R is defined above;

wherein $X_4$, $X_5$ and $X_6$ each represents a hydrogen atom or a group represented by the formula: RCO-, wherein R is as defined above; one of $X_4$, $X_5$ and $X_6$ is a hydrogen atom, and two of $X_4$, $X_5$ and $X_6$ are each a group represented by the formula: RCO-, wherein R is as defined above; and 0 to 15% by weight of

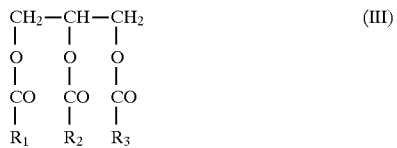

wherein $R_1$, $R_2$ and $R_3$ each represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms; and at least one gas oil additive selected from the group consisting of a metal deactivator and a cetane number improver.

8. A gas oil additive composition comprising a mixture of a first compound represented by the following formula (I), a second compound represented by the following formula (II), a third compound represented by the following formula (III) and a fourth compound represented by the formula (IV) as an additive, wherein the total amount of the compounds represented by formulas (I) and (II) is not less than 80% by weight and less than 100% by weight based on the total weight of the compounds represented by formulas (I), (II), (III) and (IV); and the weight ratio of the compound represented by formula (I) to the compound represented by formula (II) is 0.5 to 4.0:

wherein $X_1$, $X_2$ and $X_3$ each represents a hydrogen atom or a group represented by the formula: RCO-, wherein R represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms, two of $X_1$, $X_2$ and $X_3$ are hydrogen atoms, and one of $X_1$, $X_2$ and $X_3$ is a group represented by the formula: RCO-, wherein R is defined above;

wherein $X_4$, $X_5$ and $X_6$ each represents a hydrogen atom or a group represented by the formula: RCO-, wherein R is as defined above; one of $X_4$, $X_5$ and $X_6$ is a hydrogen atom, and two of $X_4$, $X_5$ and $X_6$ are each a group represented by the formula: RCO-, wherein R is as defined above; 0 to 15% by weight of

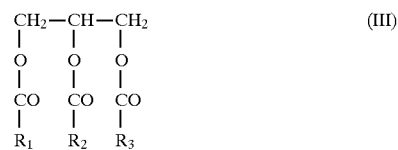

wherein $R_1$, $R_2$ and $R_3$ each represents a linear or branched alkyl group having 9 to 22 carbon atoms, an alkyl group having a cycloalkyl moiety and having 9 to 22 carbon atoms in total, or a linear or branched alkenyl group having 9 to 22 carbon atoms; and 0 to 2.5% by weight of

and; at least one gas oil additive selected from the group consisting of a metal deactivator and a cetane number improver.

* * * * *